(12) United States Patent
Chen

(10) Patent No.: US 6,736,503 B1
(45) Date of Patent: May 18, 2004

(54) ELASTIC JOINT FOR EYEGLASSES

(76) Inventor: Ward Chen, 632 New York Dr., Pomona, CA (US) 91768

( * ) Notice: Subject to any disclaimer, the term of this patent is extended or adjusted under 35 U.S.C. 154(b) by 79 days.

(21) Appl. No.: 10/447,568

(22) Filed: May 29, 2003

(51) Int. Cl.[7] ................................................. G02C 5/16
(52) U.S. Cl. ......................... 351/114; 351/153; 16/228
(58) Field of Search ................................. 351/113, 114, 351/119, 121, 153; 16/228

(56) References Cited

U.S. PATENT DOCUMENTS 2,761,353 A * 9/1956 Eustic ........................ 351/113
5,818,567 A * 10/1998 Sakai ......................... 351/113

* cited by examiner

*Primary Examiner*—Huy Mai
(74) *Attorney, Agent, or Firm*—Joe Nieh

(57) ABSTRACT

The elastic joint for eyeglasses comprises of a one-piece flexible component that is attached to the joint between the temple and the lens frame. The one-piece flexible component has an oblong-circle profile defining a through-hole near one extremity of the oblong profile and a hinge joint at the other extremity of the oblong profile. The hinge joint on the elastic joint for eyeglasses is hinged to the joint between the temple and the lens frame with the through-hole extremity positioned at the joint between the temple and the lens frame. The elastic joint for eyeglasses will maintain a comfortable tension to retain the eyeglasses on the user.

6 Claims, 2 Drawing Sheets

ELASTIC JOINT FOR EYEGLASSES

BACKGROUND

1. Field of Invention

The present invention relates generally to eyeglasses and sunglasses. More specifically, the present invention relates to a hinged joint that attaches between the temple and the lens frame on a pair of eyeglasses or sunglasses.

2. Description of Related Art

Eyeglasses comprises of two temples attached to the two ends of a lens frame with two lenses affixed to the lens frame. The wearer of the eyeglasses rests the two temples on the wearer's ears and rests the nose pad on the lens frames on the nose. Generally the distance between the temples is adjusted to fit the width of the wearer's head.

Traditional eyeglasses use a simple hinge type of attachment to attach the two temples to the lens frame. The only possible flexibility in the eyeglasses in this design is the flexibility of the material used to fabricate the temples and the lens frame. The temples and the lens frame will have to bend to conform to the wearer. With temples and lens frame that are made of relatively rigid material, the flexibility is limited. As the wearer of the eyeglasses talks, chews food, and makes facial expressions, the pressure of the temples on the wearer's head increases and can become uncomfortable for the wearer of the eyeglasses.

One common design that alleviates the pressure of the temples on the wearer's head and to allow better fitting of the eyeglasses to the wearer is to incorporate a spring design that flexibly attaches the temples to the lens frame. The spring design allows the temple to flex and maintain a constant comfortable pressure on the wearer's head. However, the spring design adds appreciable costs to the eyeglasses and also introduces a small complex mechanism to the simple design of eyeglasses.

SUMMARY OF THE INVENTION

The present invention is an elastic joint for eyeglasses. The elastic joint for eyeglasses comprises of a one-piece flexible component that is attached to the joint between the temple and the lens frame. The one-piece flexible component has an oblong-circle profile defining a through-hole near one extremity of the oblong profile and a hinge joint at the other extremity of the oblong profile. The hinge joint on the elastic joint for eyeglasses is hinged to the joint between the temple and the lens frame with the through-hole extremity positioned at the joint between the temple and the lens frame. The elastic joint for eyeglasses allows the distance between the temples to expand without undue pressure on the wearer's head.

DETAILED DESCRIPTION OF THE PREFERRED EMBODIMENT

Figure 1:
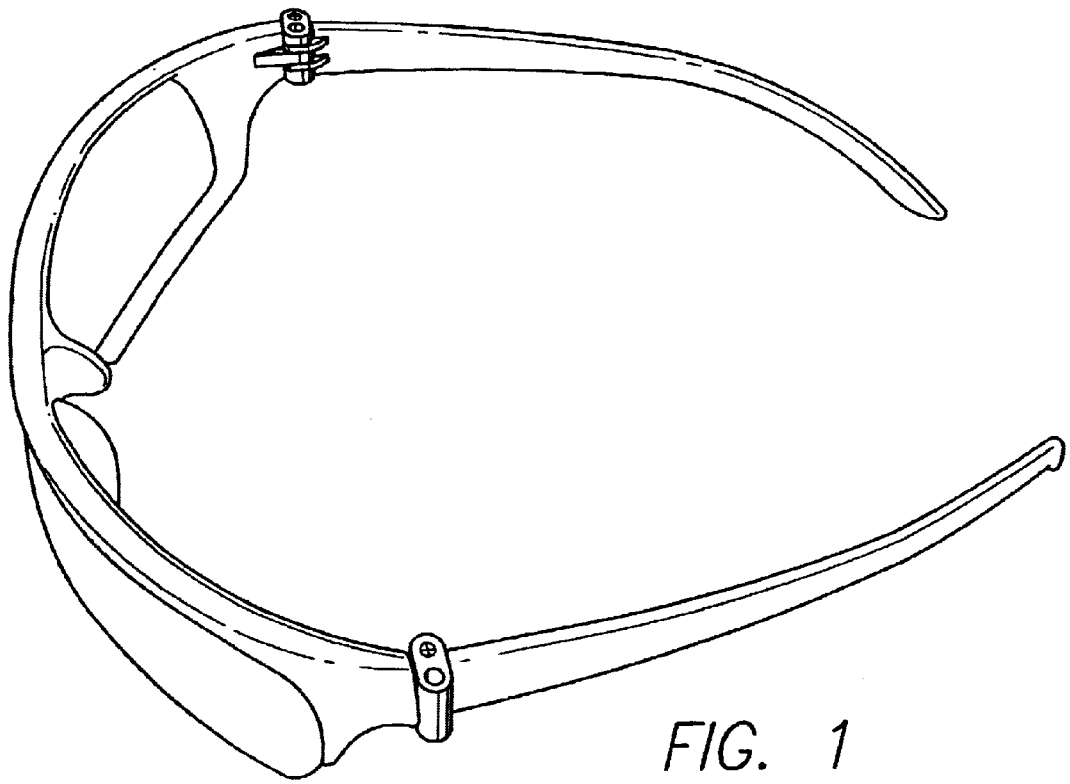
FIG. 1 shows a perspective view of a pair of eyeglasses with the elastic joint for eyeglasses.
Figure 2:
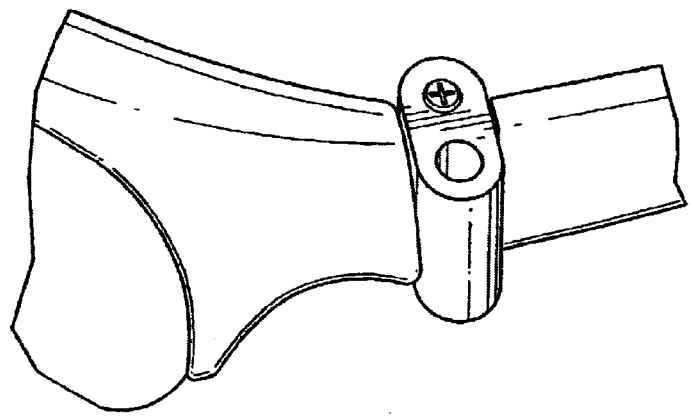
FIG. 2 shows an enlarged view of the elastic joint for eyeglasses attached to a pair of eyeglasses.
Figure 3:
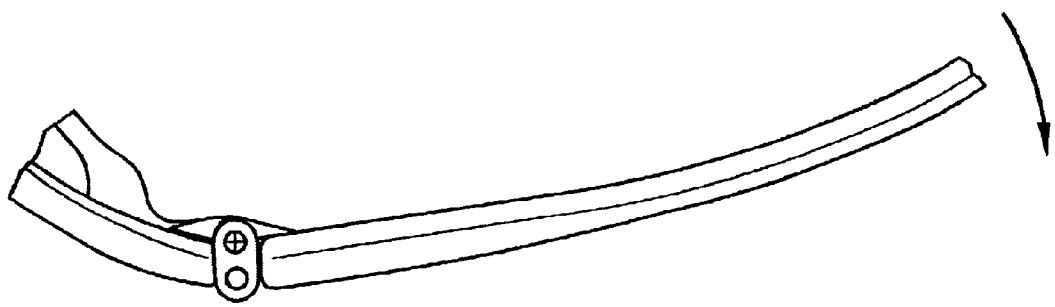
FIG. 3 shows pressure being applied to the temple on a pair of eyeglasses with the elastic joint for eyeglasses.
Figure 4:
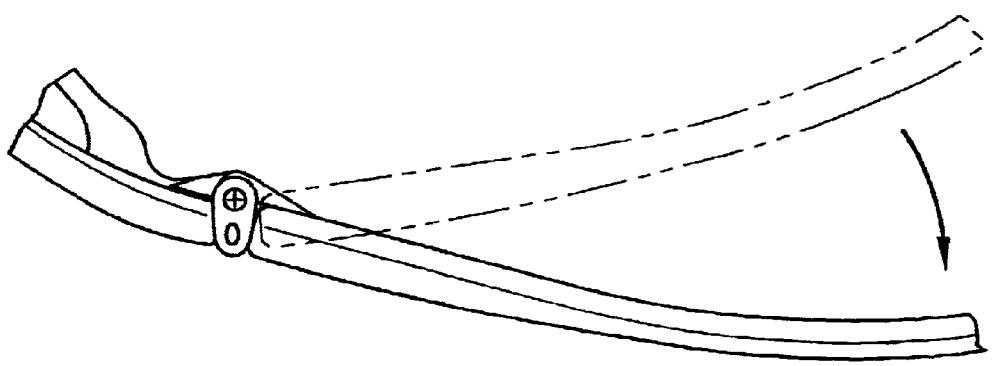
FIG. 4 shows pressure being applied to the temple on a pair of eyeglasses with the elastic joint for eyeglasses and compressing the elastic joint for eyeglasses.

FIG. 1 shows the preferred embodiment of the elastic joint for eyeglasses. The elastic joint for eyeglasses comprises of a one-piece flexible component that is attached to the joint between the temple and the lens frame as shown in FIG. 2. The one-piece flexible component has an oblong-circle profile defining a through-hole near one extremity of the oblong profile and a hinge joint at the other extremity of the oblong profile. The hinge joint on the elastic joint for eyeglasses is hinged to the joint between the temple and the lens frame with the through-hole extremity positioned at the joint between the temple and the lens frame. As shown in FIG. 3, when pressure is applied outward on the temples, the distance between the temples is increased and the elastic joint for eyeglasses will be flexibly compressed as shown in FIG. 4. When the pressure is removed from the temples, the compressed elastic joint for eyeglasses will return to its original profile and urge the temples to maintain a comfortable tension to retain the eyeglasses on the user.

What is claimed is:

1. An elastic joint for eyeglasses comprising an elastic insert hinged between a temple and a lens frame on a pair of eyeglasses wherein said elastic insert has an oblong profile with a first extremity and a second extremity defining a through-hole at the first extremity and a hinge at the second extremity wherein the elastic joint for eyeglasses will enable the temple to flex when pressure is applied to the temple.

2. An elastic joint for eyeglasses as in claim 1 wherein the elastic insert is made of rubber.

3. An elastic joint for eyeglasses as in claim 2 wherein the through-hole at the first extremity is round.

4. An elastic joint for eyeglasses as in claim 1 wherein the elastic insert is made of plastic.

5. An elastic joint for eyeglasses as in claim 4 wherein the through-hole at the first extremity is round.

6. An elastic joint for eyeglasses as in claim 1 wherein the through-hole at the first extremity is round.

* * * * *